United States Patent
Jana et al.

(10) Patent No.: US 11,166,156 B2
(45) Date of Patent: Nov. 2, 2021

(54) SECURE FRIENDSHIP ESTABLISHMENT IN A MESH NETWORK

(71) Applicant: QUALCOMM Incorporated, San Diego, CA (US)

(72) Inventors: Sourabh Jana, Bangalore (IN); Chirag Manojkumar Kharvar, Bangalore (IN); Ravi Shekhar, Thubarahalli (IN)

(73) Assignee: QUALCOMM INCORPORATED, San Diego, CA (US)

( * ) Notice: Subject to any disclaimer, the term of this patent is extended or adjusted under 35 U.S.C. 154(b) by 453 days.

(21) Appl. No.: 16/125,650

(22) Filed: Sep. 7, 2018

(65) Prior Publication Data
US 2020/0084620 A1     Mar. 12, 2020

(51) Int. Cl.
| | |
|---|---|
| *H04W 12/04* | (2021.01) |
| *H04W 76/10* | (2018.01) |
| *H04L 9/08* | (2006.01) |
| *H04L 29/06* | (2006.01) |
| *H04W 4/80* | (2018.01) |
| *H04L 29/08* | (2006.01) |

(52) U.S. Cl.
CPC .......... *H04W 12/04* (2013.01); *H04L 9/0866* (2013.01); *H04L 9/0869* (2013.01); *H04L 63/0435* (2013.01); *H04W 76/10* (2018.02); *H04L 67/12* (2013.01); *H04L 2209/805* (2013.01); *H04W 4/80* (2018.02)

(58) Field of Classification Search
CPC ....... H04W 12/04; H04W 76/10; H04W 4/80; H04L 9/0866; H04L 63/0435; H04L 9/0869; H04L 67/12; H04L 2209/805
See application file for complete search history.

(56) References Cited

U.S. PATENT DOCUMENTS

| | | | |
|---|---|---|---|
| 7,681,033 B2 * | 3/2010 | Miura | H04L 63/08 713/155 |
| 7,730,482 B2 | 6/2010 | Illowsky et al. | |
| 7,793,103 B2 | 9/2010 | Fu et al. | |
| (Continued) | | | |

OTHER PUBLICATIONS

Digi-Key Electronics: "Designing Bluetooth Low Energy Smart Applications with Bluetooth Mesh—Part 1", 2018, 7 pages.

(Continued)

*Primary Examiner* — Paul E Callahan
(74) *Attorney, Agent, or Firm* — Muncy, Geissler, Olds & Lowe, P.C.

(57) ABSTRACT

Disclosed are techniques for establishing an encrypted connection between a first node and a second node in a wireless mesh network. In an aspect, the first node receives, from a provisioner node in the wireless mesh network, a first value encrypted with a device-specific encryption key known only to the first node and the provisioner node, wherein the second node receives, from the provisioner node, the first value encrypted with a second device-specific encryption key, generates a friendship-specific encryption key based on the first value, an identifier of the first node, and an identifier of the second node, wherein the second node generates the friendship-specific encryption key, sends, to the second node, a first message encrypted with the friendship-specific encryption key, and receives, from the second node, a second message encrypted with the friendship-specific encryption key.

22 Claims, 7 Drawing Sheets

(56) References Cited

U.S. PATENT DOCUMENTS

| | | |
|---|---|---|
| 9,191,988 B2 | 11/2015 | Newham |
| 2009/0287922 A1* | 11/2009 | Herwono .............. H04L 9/0822 |
| | | 713/155 |
| 2018/0123782 A1* | 5/2018 | Messerges ............ H04L 9/0819 |

OTHER PUBLICATIONS

Woolley M., "Bluetooth Mesh Networking—An Introduction for Developers", 2017, 28 pages.

Adomnicai A., et al., "Hardware Security Threats against Bluetooth Mesh Networks", IEEE Conference on Communications and Network Security (CNS), IEEE, May 30, 2018 (May 30, 2018), pp. 1-9, XP033383983, DOI: 10.1109/CNS.2018.8433184, [retrieved on Aug. 10, 2018], abstract; figures 1, 3.

International Search Report and Written Opinion—PCT/US2019/044590—ISA/EPO—dated Sep. 27, 2019.

Ren K., "Bluetooth Mesh Networking: Friendship | Bluetooth Technology Website", Aug. 24, 2017 (Aug. 24, 2017), pp. 1-10, XP055503248, Retrieved from the Internet: URL:http://blog.bluetooth.com/bluetooth-mesh-networking-series-friendship [retrieved on Aug. 29, 2018]p. 4, line 5-p. 5, line 19.

Snellman H., et al., "Bluetooth Mesh: Wireless Technology for the World of IoT", Aug. 15, 2017 (Aug. 15, 2017), 24 pages, XP055526117, Retrieved from the Internet: URL: https://www.engineeringwhitepapers.com/bluetooth/bluetooth-mesh-wireless-technology-world-iot/,[retr . . . on Nov. 22, 2018].

* cited by examiner

SECURE FRIENDSHIP ESTABLISHMENT IN A MESH NETWORK

TECHNICAL FIELD

The various aspects described herein generally relate to wireless communications, and in particular, to secure friendship establishment in a mesh network.

BACKGROUND

All wireless networking technologies generally have a limited range. However, there are many environments in which devices that are otherwise outside communication range of each other may need to communicate using a reliable low-power wireless technology. For example, the Internet of Things (IoT) is based on the idea that everyday objects, not just computers and computer networks, can be read, recognized, located, addressed, and otherwise controlled via an IoT communications network (e.g., an ad-hoc system or the Internet).

One way to address issues that arise when devices are outside a maximum communication range of each other is to implement a mesh network, which has a topology in which all devices can communicate with each other either directly or indirectly. For example, two devices that are in radio range may communicate directly, whereas communication with devices located outside radio range of each other may be achieved via one or more intermediate "relay" nodes. Mesh networks may therefore offer multiple paths to route a message from a source to a destination, resulting in greater reliability relative to other networks that tend to flow all traffic through a central hub (e.g., a router or gateway).

Accordingly, a wireless mesh network may generally refer to a network in which various devices or "nodes" have the ability to receive and act upon messages in addition to having the ability to repeat or relay the messages to surrounding devices or nodes that are within radio range. The mesh architecture may therefore extend the effective radio range associated with whatever wireless technology is used to convey the messages, and thereby can be used to implement the IoT and other suitable use cases that are built at least in part on wireless communications.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for establishing an encrypted connection between a first node and a second node in a wireless mesh network includes receiving, at the first node from a provisioner node in the wireless mesh network, a first value encrypted with a device-specific encryption key known only to the first node and the provisioner node, wherein the second node receives, from the provisioner node, the first value encrypted with a second device-specific encryption key known only to the second node and the provisioner node, generating, by the first node, a friendship-specific encryption key based on the first value, an identifier of the first node, and an identifier of the second node, wherein the second node generates the friendship-specific encryption key based on the first value, the identifier of the first node, and the identifier of the second node, sending, by the first node to the second node, a first message encrypted with the friendship-specific encryption key, and receiving, at the first node from the second node, a second message encrypted with the friendship-specific encryption key.

In an aspect, an apparatus for establishing an encrypted connection between a first node and a second node in a wireless mesh network includes a wireless interface of the first node configured to receive, from a provisioner node in the wireless mesh network, a first value encrypted with a device-specific encryption key known only to the first node and the provisioner node, wherein the second node receives, from the provisioner node, the first value encrypted with a second device-specific encryption key known only to the second node and the provisioner node, and at least one processor of the first node configured to generate a friendship-specific encryption key based on the first value, an identifier of the first node, and an identifier of the second node, wherein the second node generates the friendship-specific encryption key based on the first value, the identifier of the first node, and the identifier of the second node, and cause the wireless interface to send, to the second node, a first message encrypted with the friendship-specific encryption key, wherein the wireless interface is further configured to receive, from the second node, a second message encrypted with the friendship-specific encryption key.

In an aspect, a non-transitory computer-readable medium storing computer-executable instructions for establishing an encrypted connection between a first node and a second node in a wireless mesh network includes computer-executable instructions comprising at least one instruction instructing the first node to receive, from a provisioner node in the wireless mesh network, a first value encrypted with a device-specific encryption key known only to the first node and the provisioner node, wherein the second node receives, from the provisioner node, the first value encrypted with a second device-specific encryption key known only to the second node and the provisioner node, at least one instruction instructing the first node to generate a friendship-specific encryption key based on the first value, an identifier of the first node, and an identifier of the second node, wherein the second node generates the friendship-specific encryption key based on the first value, the identifier of the first node, and the identifier of the second node, at least one instruction instructing the first node to send, to the second node, a first message encrypted with the friendship-specific encryption key, and at least one instruction instructing the first node to receive, from the second node, a second message encrypted with the friendship-specific encryption key.

In an aspect, an apparatus for establishing an encrypted connection between a first node and a second node in a wireless mesh network includes a means for communicating of the first node configured to receive, from a provisioner node in the wireless mesh network, a first value encrypted with a device-specific encryption key known only to the first node and the provisioner node, wherein the second node receives, from the provisioner node, the first value encrypted with a second device-specific encryption key known only to the second node and the provisioner node, and a means for processing of the first node configured to generate a friendship-specific encryption key based on the first value, an identifier of the first node, and an identifier of the second node, wherein the second node generates the friendship-specific encryption key based on the first value, the identifier of the first node, and the identifier of the second node, and cause the means for communicating to send, to the second node, a first message encrypted with the friendship-specific encryption key, wherein the means for communicating is further configured to receive, from the second node, a second message encrypted with the friendship-specific encryption key.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "node" refers to a mobile or stationary device that is a member of a wireless mesh network. A node may be a cellular telephone, a "smart phone," a personal or mobile multimedia player, a personal data assistant, a laptop computer, a desktop computer, a tablet computer, a wireless gaming controller, an IoT device (e.g., a "smart" thermostat, refrigerator, microwave, speaker system, meter, etc.), and similar devices with a programmable processor, memory, and circuitry to connect to and communicate over a radio access network (RAN) that implements a particular radio access technology (RAT) over a wired network, over a wireless local area network (WLAN) (e.g., based on IEEE 802.11, etc.), and/or with other devices via a direct device-to-device (D2D) or peer-to-peer (P2P) connection (e.g., a Bluetooth® connection).

Figure 1:
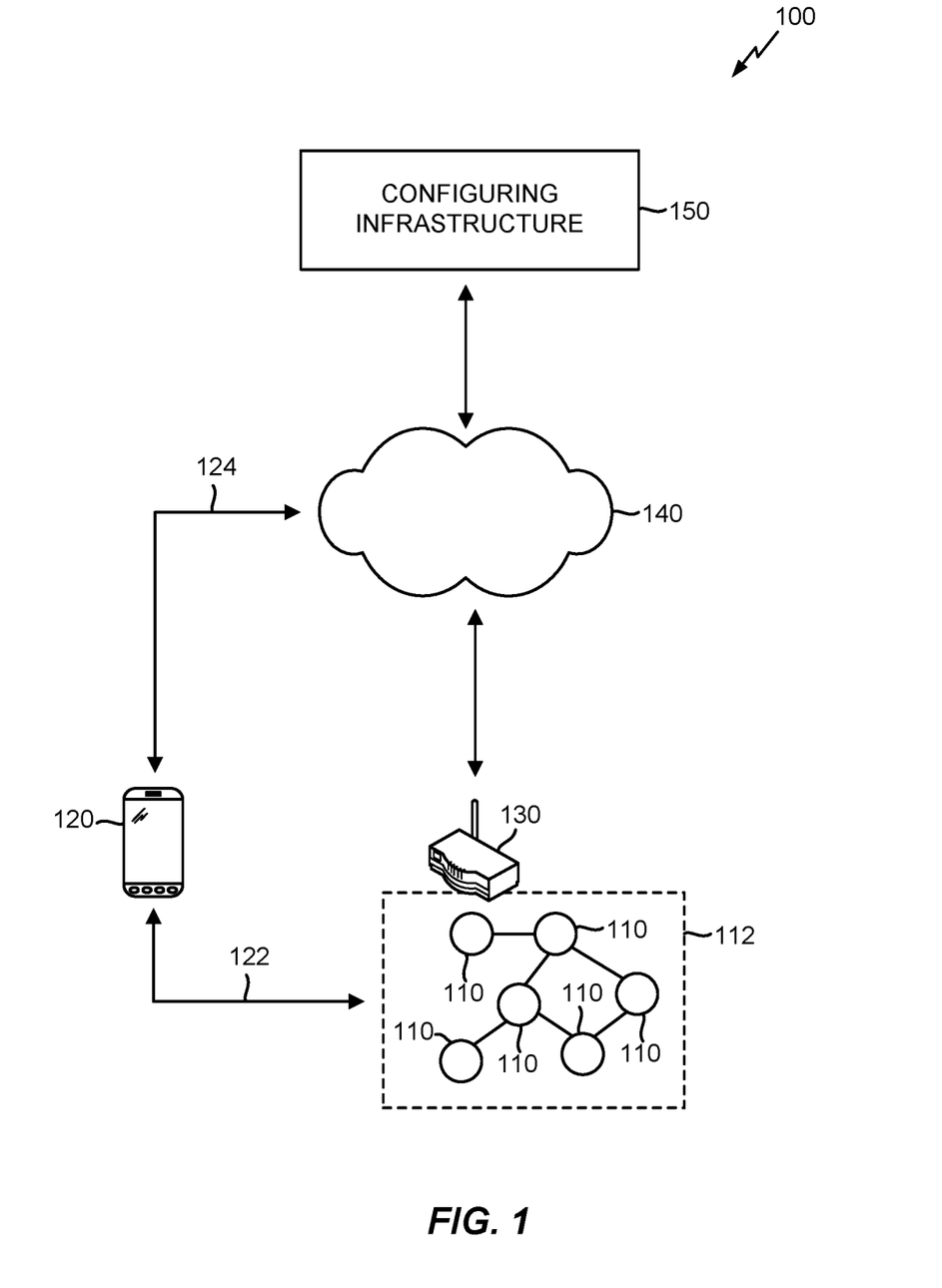
FIG. 1 illustrates an exemplary wireless mesh network in which the various aspects described herein may be suitably implemented.

According to various aspects, FIG. 1 illustrates an exemplary wireless mesh network 100 in which the various aspects described herein may be suitably implemented. More particularly, the example wireless mesh network 100 may comprise various nodes 110, which may optionally be organized as a group 112, a controller 120 (e.g., a mobile device), a gateway 130, and a configuring infrastructure 150 in communication via a network "cloud" 140 (e.g., the Internet). Furthermore, although the controller 120 and the gateway 130 are depicted in FIG. 1 as elements separate from the nodes 110, those skilled in the art will appreciate that the controller 120 and/or the gateway 130 can be included among the nodes 110 in various aspects. In general, the nodes 110 may be the basic building blocks of the wireless mesh network 100, wherein the nodes 110 may comprise any suitable device that can be configured to send, receive, and relay messages to surrounding nodes 110 (i.e., devices). In various aspects, message communication among the nodes 110 may generally be based on broadcast messages, which may be transmitted via one or more wireless channels.

According to various aspects, the controller 120 (which may also be referred to as a provisioner node) may be configured to establish a wireless connection 122 with the nodes 110, whereby the controller 120 may use a wireless radio to communicate with the nodes 110 in the wireless mesh network 100. Furthermore, in various aspects, the controller 120 may have an additional communication path 124 to the wireless mesh network 100. For example, in various aspects, the controller 120 may use a configuring application to communicate with the configuring infrastructure 150 via the additional communication path 124 (e.g., via a web console or service). As such, the configuring infrastructure 150 may service configuration commands received from the controller 120 (e.g., to securely distribute a network key to a new node 110, to program a particular node 110 to be within the group 112 or another group, etc.). In various aspects, the gateway 130 (e.g., an access point) may link the various nodes 110 to the network 140 and allow command and control over a local area network (LAN) or wireless LAN (WLAN) to which the gateway 130 is connected. Like other elements in the wireless mesh network 100, the gateway 130 may also use a wireless radio to communicate with the various nodes 110 via a wireless channel. According to various aspects, the wireless mesh network 100 may enable the nodes 110 to send, receive, and/or relay messages (e.g., command and control operations), which may originate at one or more of the nodes 110 and/or be received from the controller 120 via the wireless connection 122 or from the gateway 130 via the additional communication path 124 between the controller 120 and the nodes 110.

According to various aspects, at least the nodes 110, the controller 120, and the gateway 130 may be configured to communicate with one another via a wireless mesh protocol, which may generally enable devices to send, receive, and relay messages to surrounding devices located within radio range, thus forming an ad-hoc mesh network. For example, message communication may be based on broadcast messages transmitted and received via one or more wireless channels (e.g., a Bluetooth® broadcast channel), wherein each node 110 that receives a broadcast message may accept and forward the message to other nodes 110 within radio range. In this manner, the range over which the nodes 110 can communicate may be easily extended, as one or more intermediate nodes 110 can be used to relay a message to another node 110 that is otherwise located outside radio range of the originating node 110. As such, the wireless mesh protocol may enable the wireless mesh network 100 to be easily extended to accommodate new devices, which can also increase the geographic coverage of the wireless mesh network 100 depending on device placement. The wireless mesh protocol can therefore be used to support various different use cases that are built, at least in part, on point-to-point, point-to-multipoint, and/or other suitable wireless communications.

Figure 2:
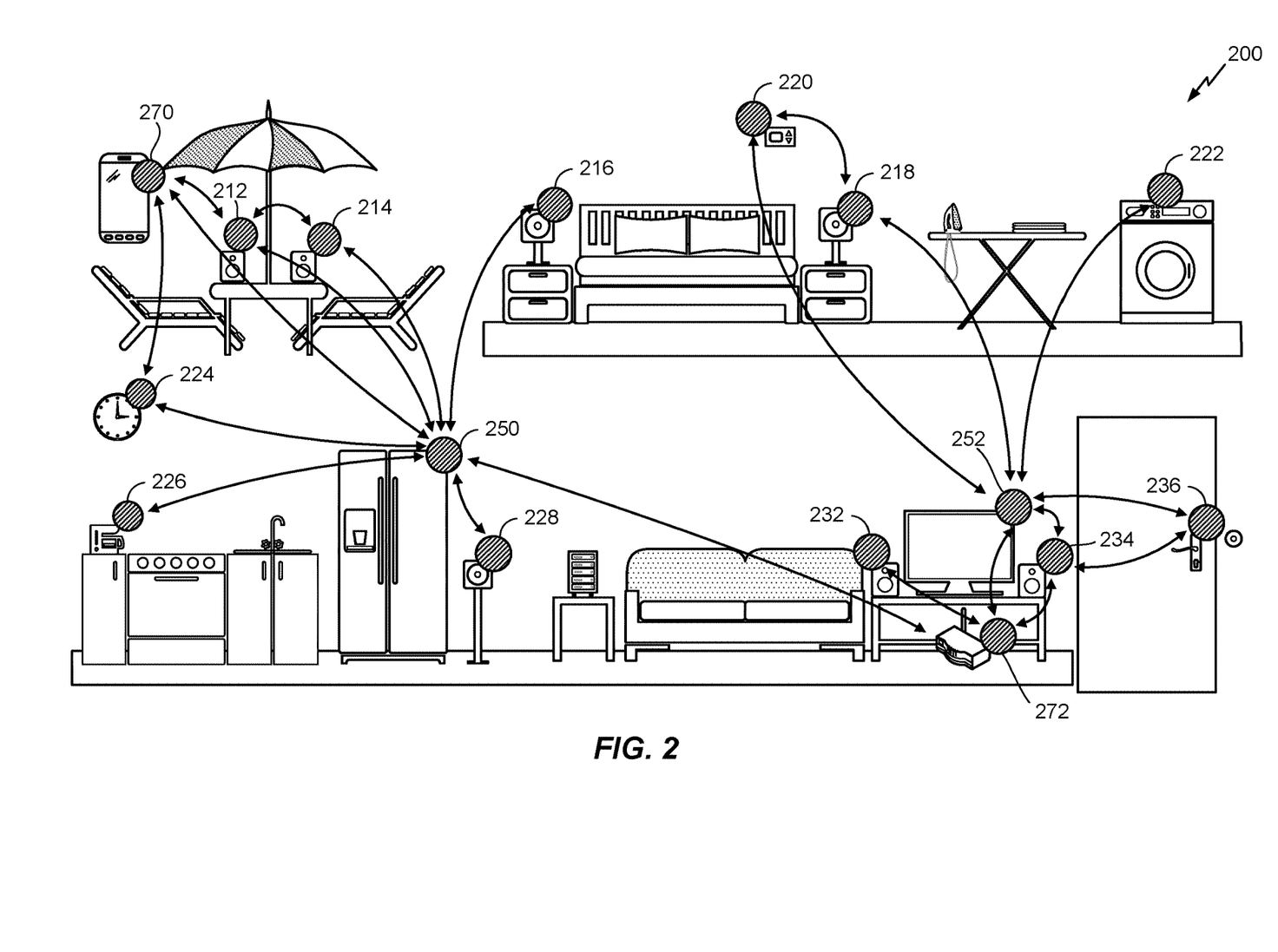
FIG. 2 illustrates an exemplary environment in which a wireless mesh network implementing the various aspects described herein may be deployed.

According to various aspects, FIG. 2 illustrates one exemplary environment 200 in which a wireless mesh network may be suitably implemented. In the exemplary environment 200 shown in FIG. 2, the wireless mesh network supports a home automation or an IoT use case, where home appliances, lights, electrical switches, thermostats, etc. can form a wireless mesh network and be controlled via the wireless mesh protocol, either directly using one or more user devices or indirectly via a gateway device in communication with the one or more user devices (e.g., a smartphone, a laptop computer, etc.). For example, the particular environment 200 as shown in FIG. 2 includes a smartphone 270 (which may correspond to controller 120), outdoor speakers 212 and 214, bedroom speakers 216 and 218, a thermostat 220, a laundry machine 222, a clock 224, a coffee machine 226, a refrigerator 250, a kitchen speaker 228, family room speakers 232 and 234, a television 252, an electronic lock 236, and a home gateway device 272 (which may correspond to gateway 130 in FIG. 1). The various devices may communicate with other devices within sufficient range (e.g., via broadcast messages) and the messages may be received and relayed as appropriate to ensure that the message(s) reach the intended destination. For example, in the environment 200 shown in FIG. 2, a user may press a button on the smartphone 270 to engage the electronic lock 236, which is located outside radio range from the smartphone 270. However, the smartphone 270 is within radio range from the outdoor speakers 212 and 214, the clock 224, and the refrigerator 250. Accordingly, the smartphone 270 may broadcast a message containing a command to engage the electronic lock 236, and the outdoor speakers 212 and 214, the clock 224, and the refrigerator 250 may each relay the message until the message eventually reaches the electronic lock 236.

Figure 3:
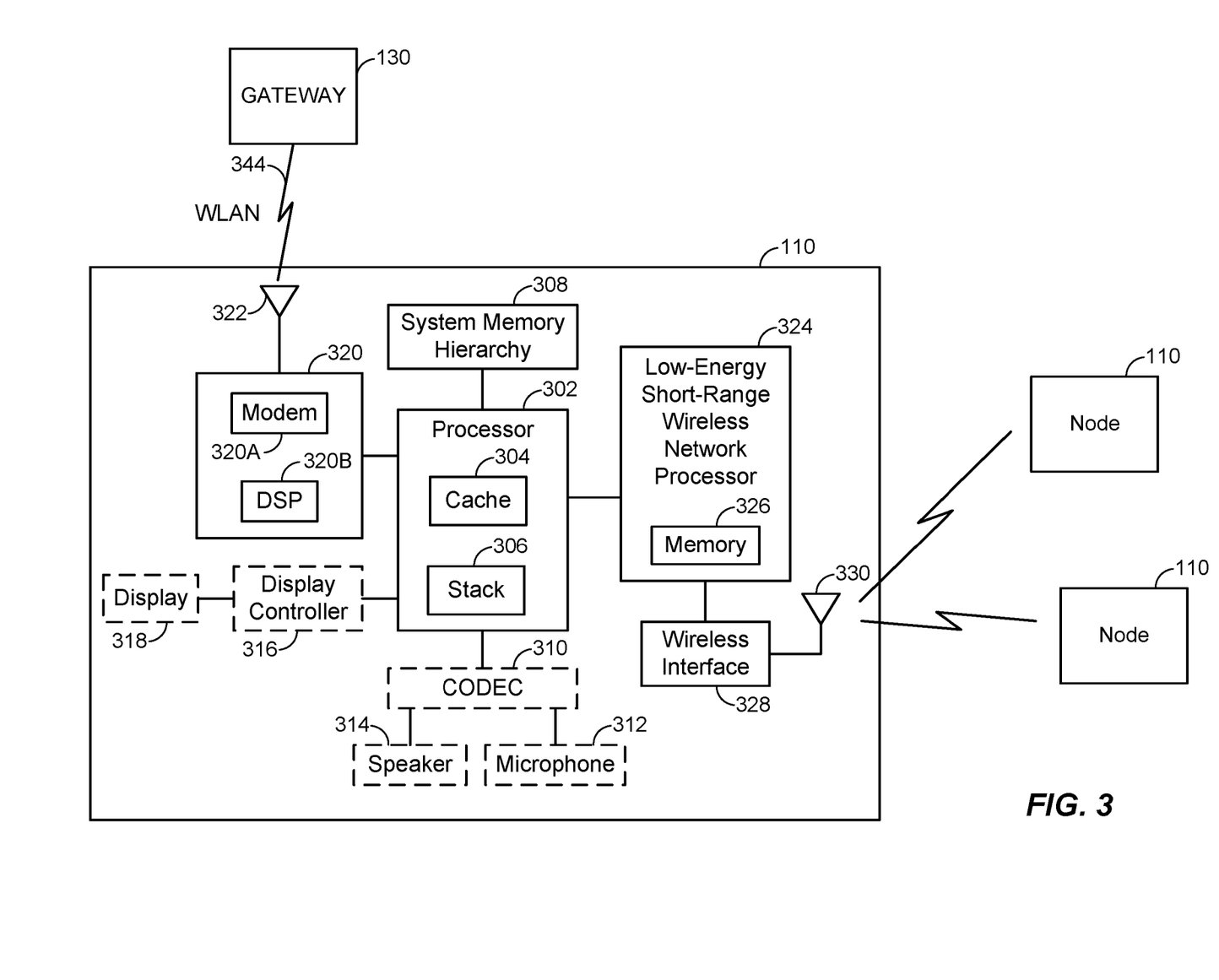
FIG. 3 illustrates an exemplary mesh network node device according to at least one aspect of the disclosure.

FIG. 3 illustrates an exemplary node 110 according to at least one aspect of the disclosure. A main processor 302 for the node 110 runs applications that cause the node 110 to perform the functionality described herein, and includes a cache memory 304 as well as an interface to store and retrieve data and instructions from off-chip memory, represented in FIG. 3 as the system memory hierarchy 308. The system memory hierarchy 308 may comprise various volatile and non-volatile memory systems.

The node 110 is capable of interfacing with wireless local area networks by way of a communication device 320 and an antenna 322. The communication device 320 is illustrated as comprising a modem 320A and a digital signal processor (DSP) 320B, although in practice other kinds of modules may be employed, all or some such modules may be integrated on a single chip, and some of the modules may be integrated with the processor 302. In an aspect, the communication device 320 may alternatively be referred to as a transceiver or wireless interface. In the example of FIG. 3, the node 110 has a WLAN link 344 to the gateway 130, which provides access to the network 140 (not shown).

In an aspect, the main processor 302 may implement a low-energy short-range wireless network protocol stack 306, such as a Bluetooth® Low Energy (BLE) protocol stack or a Bluetooth® mesh protocol stack, in which instructions for performing some or all of the low-energy short-range wireless network protocol stack 306 are stored in the system memory hierarchy 308. However, in the example of FIG. 3, a separate chip or an embedded hardware core, shown as a low-energy short-range wireless network processor 324, implements the portions of the low-energy short-range wireless network protocol stack 306 to perform the low-energy short-range wireless network operations described herein. The low-energy short-range wireless network processor 324 comprises a memory 326, shown as an on-chip memory, although the memory 326 may be part of a memory hierarchy in which some memory also resides off-chip. The wireless interface 328 provides an interface to the antenna 330, suitable for operating in the designated frequency spectrum utilized by the low-energy short-range wireless network. Communication may be made to any number of low-energy short-range wireless network capable devices, such as one or more other nodes 110 (two in the example of FIG. 3, but there may be more or fewer than two). The instructions for implementing some or all of the low-energy short-range wireless network operations described herein may be stored in a memory, such as memory 326. The memory 326 may be referred to as a non-transitory computer-readable medium.

As illustrated in FIG. 3, the node 110 includes both a communication device 320 that permits the node 110 to act as an access terminal to the gateway 130, and a low-energy short-range wireless network processor 324 and wireless interface 328 that together permit the node 110 to act as a low-energy mesh network node in a low-energy mesh network, such as wireless mesh network 100. For example, the node 110 may receive information for another node 110 from the gateway 130 via the communication device 320. The node 110 may establish a connection with all downlink nodes 110 and transmit the information in one or more data packet(s) to the downlink nodes 110 using the low-energy short-range wireless network processor 324 and wireless interface 328.

The node 110 may optionally include a user interface. As shown in FIG. 3, the node 110 may include a CODEC (Coder-Decoder) 310 for interfacing with a microphone 312 and a speaker 314. A display controller 316 provides an interface to a display 318 so that the user may interact with the node 110.

In an aspect, the low-energy short-range wireless network processor 324, as directed by instructions stored in memory 326, may cause the node 110 to perform the operations described herein. Thus, for example, the low-energy short-range wireless network processor 324, the memory 326, and the wireless interface 328 may all be used cooperatively to load, store, and execute the various operations disclosed herein, and as such, the logic to perform these operations may be distributed over various elements. Alternatively, the functionality could be incorporated into one discrete component (e.g., the low-energy short-range wireless network processor 324). Therefore, the features of the node 110 are to be considered merely illustrative and the disclosure is not limited to the illustrated features or arrangement.

For example, in an aspect, where the node 110 is configured to perform a method for establishing an encrypted connection between a first node (i.e., the node 110 performing the method) and a second node (i.e., another node 110) in a wireless mesh network (e.g., wireless mesh network 100), the low-energy short-range wireless network processor 324 may be configured to receive (via wireless interface 328 or communication device 320), from a provisioner node (e.g., controller 120, gateway 130, or another node 110) in the wireless mesh network, a first value encrypted with a device-specific encryption key known only to the first node and the provisioner node, wherein the second node receives, from the provisioner node, the first value encrypted with a second device-specific encryption key known only to the second node and the provisioner node, generate a friendship-specific encryption key based on the first value, an identifier of the first node, and an identifier of the second node, wherein the second node generates the friendship-specific encryption key based on the first value, the identifier of the first node, and the identifier of the second node, send (via wireless interface 328), to the second node, a first message encrypted with the friendship-specific encryption key, and receive (via wireless interface 328), from the second node, a second message encrypted with the friendship-specific encryption key, as described further herein.

Nodes in a mesh network (e.g., wireless mesh network 100) may communicate with each other using various wireless communication protocols, such as Zigbee, Thread, Bluetooth®, and the like. The Bluetooth® protocol used for mesh networks is referred to as "Bluetooth® mesh" and is described in various publicly available specifications from the Bluetooth® Special Interest Group (SIG). Bluetooth® mesh builds on the Bluetooth® Low Energy (BLE) protocol, which is described in various publicly available specifications from the Bluetooth® SIG.

Figure 4:
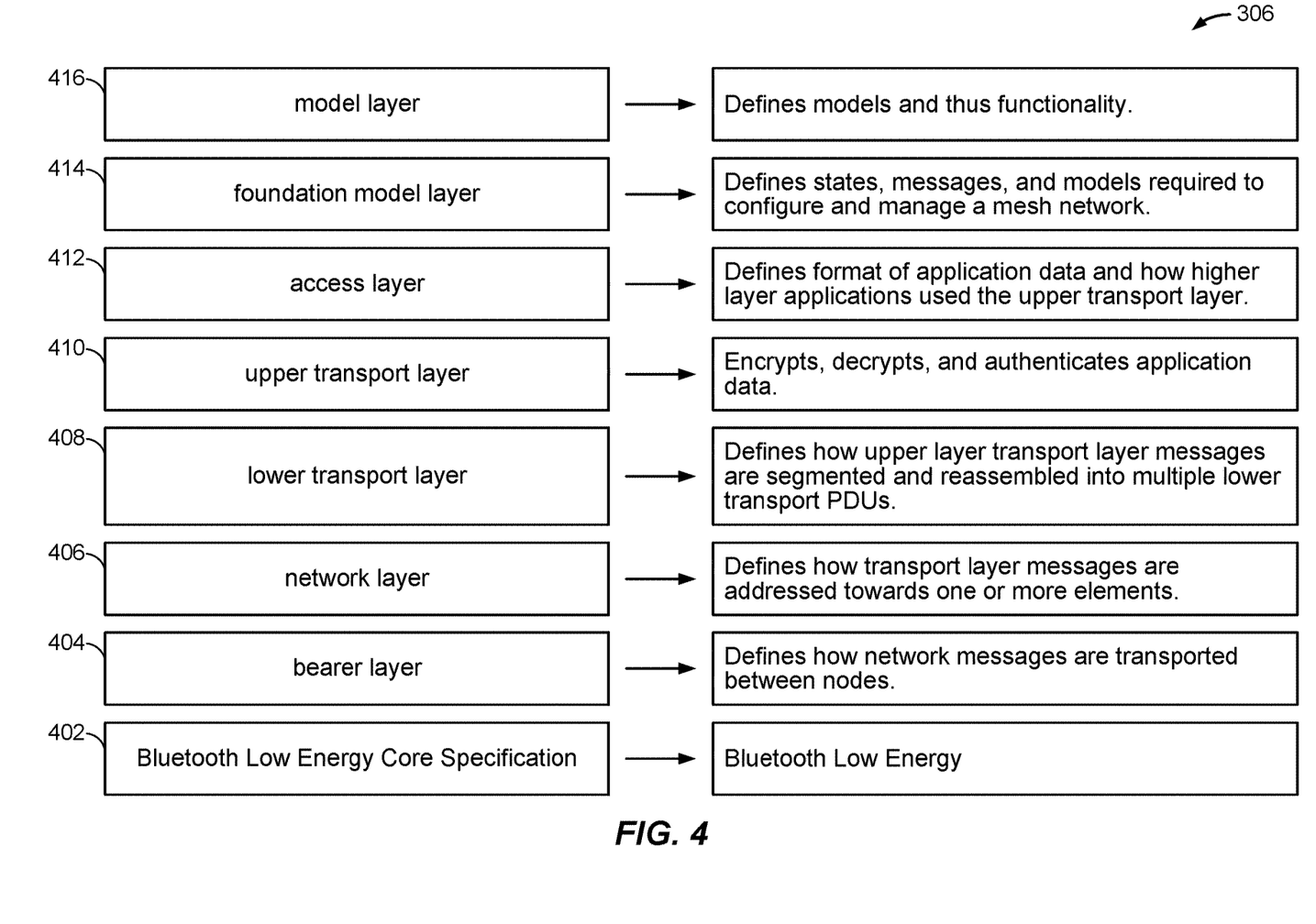
FIG. 4 illustrates the layers of the Bluetooth® mesh stack.

FIG. 4 illustrates the layers of the Bluetooth® mesh stack, which may, in an aspect, correspond to the low-energy short-range wireless network protocol stack 306 in FIG. 3. As illustrated in FIG. 4, Bluetooth® mesh is not integrated into the BLE stack, but rather, is a separate entity on top of the BLE stack. Thus, on top of the BLE Core Specification layer 402, the Bluetooth® mesh stack includes a bearer layer 404, a network layer 406, a lower transport layer 408, an upper transport layer 410, an access layer 412, a foundation model layer 414, and a model layer 416. When a Bluetooth® mesh node (e.g., node 110) receives a message, it passes the message up the layers from the underlying BLE stack (i.e., BLE Core Specification layer 402) via the bearer layer 404 to the network layer 406. The network layer 406 applies various checks to decide whether to pass the message to the transport layers 408 and 410 or discard it.

Bluetooth® mesh uses four types of nodes, Relay Nodes, Low Power Nodes (LPNs), Proxy Nodes, and Friend Nodes. Relay Nodes receive and forward messages across the mesh network. Relay Nodes generally remain in an active, or awake, mode, which significantly increases power consumption. This is not a disadvantage for mains-powered applications (where the node is hardwired or plugged in to a power source) such as smart lighting, but is a problem for non-mains-powered nodes such as switches that are incorporated into the mesh network. As such, Relay Nodes are generally mains-powered.

LPNs use the standard power-saving characteristics of BLE (e.g., remaining in a sleep state for long periods) and can therefore operate for long periods on battery power. Each LPN is connected to a mains-powered Friend Node, which remains in an active, or awake, mode and caches any messages directed to the LPN. When the LPN enters a receive mode (according to a predetermined schedule), it polls the Friend Node for any messages stored in the Friend Node's cache. The Friend Node sends all of the cached messages to the LPN (referred to as response messages), which operates as instructed and then returns to a power-saving sleep mode.

Proxy Nodes allow devices that do not include the Bluetooth® mesh stack to connect to a Bluetooth® mesh network. This is useful, for example, when a consumer wishes to use a legacy smartphone to control a smart lighting mesh network. Interaction is achieved via both the proxy node and the device's Generic Attribute Profile (GATT) interface.

Thus, with reference to FIG. 2, the thermostat 220 (battery powered) may be an example of an LPN and the bedroom speaker 218 and/or the television 252 (if mains-powered) may be examples of Friend Nodes. As another example, the clock 224 (battery powered) may be an LPN and the refrigerator 250 (mains-powered) may be a Friend Node. Further, the refrigerator 250, the television 252, and the laundry machine 222, for example, may be Relay Nodes, as they are all mains-powered. The outdoor speakers 212 and 214, the bedroom speaker 218, and the family room speaker 234 may also be Relay Nodes, even if not mains-powered, as illustrated in FIG. 2.

Each node in a wireless mesh network has its own unique device-specific encryption key (a private key, referred to as a "DevKey" in Bluetooth® mesh) known only to itself and the Provisioner Node. Each node in a wireless mesh network shares a network-specific encryption key (a public key, referred to as a "NetKey" in Bluetooth® mesh). Before a new node can take part in routine mesh operations, it is provisioned by a Provisioner Node. This is a trusted device with access to all of the nodes in the mesh network. For example, the Provisioner Node may be the controller 120 in FIG. 1. The new node is assigned an address (e.g., an Internet Protocol (IP) address), along with the network-specific and a device-specific encryption keys. After provisioning, the device-specific encryption key is used to establish a secure channel with the Provisioner Node to configure the new node.

In Friend mode, messages exchanged between the Friend Node and the LPN are encrypted with a friendship key (referred to as an "FKey"), which is generated by exchanging security credential information between the Friend Node and the LPN. LPNs are provisioned with separate credentials so that neighboring nodes will not relay messages sent by the LPN and/or its Friend Node. The Friend Node that has the shared FKey with the LPN uses the FKey to send the messages it has cached for the LPN when the LPN polls the Friend Node for those messages. Having an FKey gives the Friend Node control over the packets the LPN receives.

Figure 5:
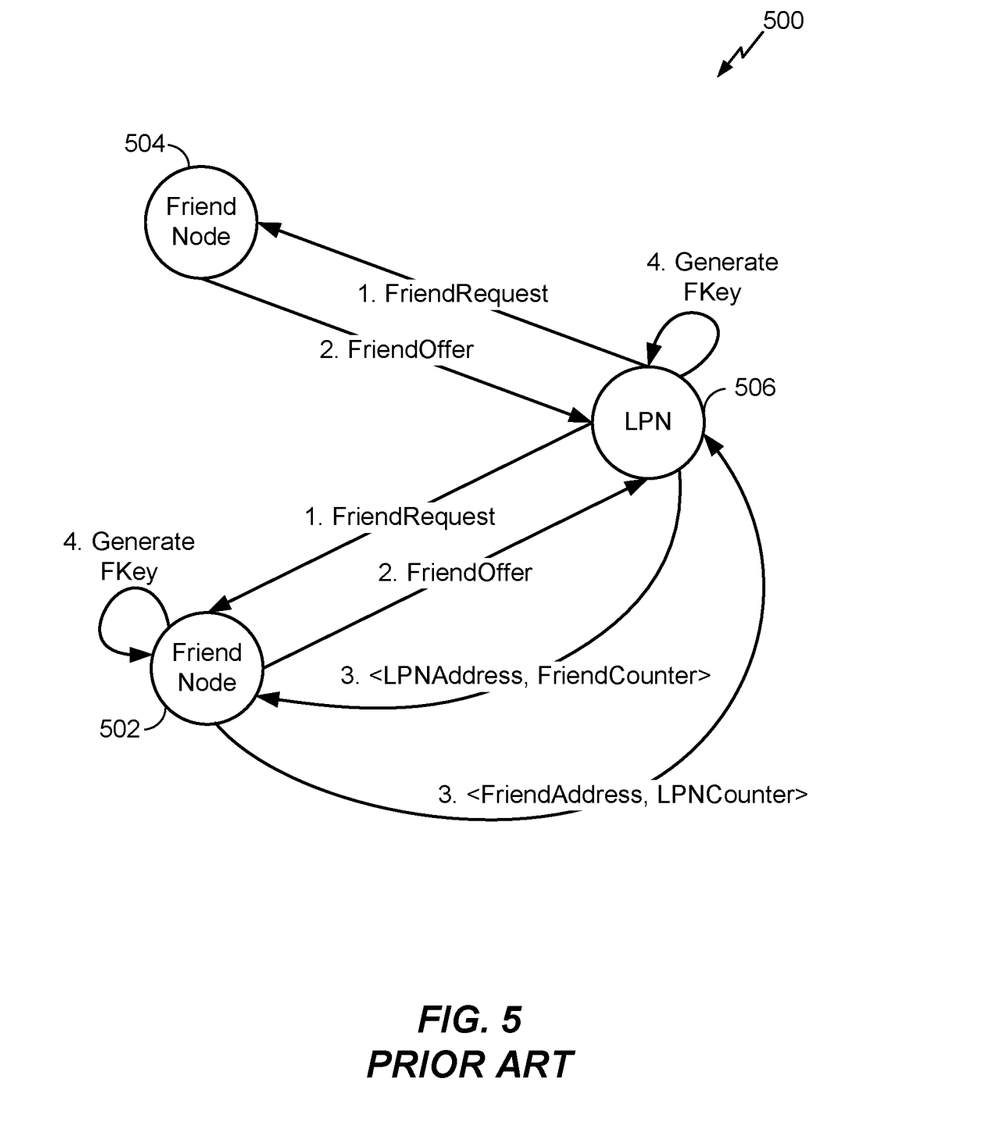
FIG. 5 is a diagram illustrating a conventional method of generating a friendship key.

FIG. 5 is a diagram 500 illustrating a conventional method of generating an FKey. At stage 1, an LPN 506 (which may correspond to one of nodes 110 in FIG. 1) broadcasts a Friend Request message to potential Friend Nodes 502 and 504 (which may correspond to other nodes 110 in FIG. 1). In an aspect, the potential Friend Nodes 502 and 504 may be nearby (i.e., within wireless communication range) nodes in the same wireless mesh network (e.g., wireless mesh network 100). The LPN 506 encrypts the Friend Request message using the NetKey, which is shared between all the nodes in the same wireless mesh network.

At stage 2, the LPN 506 receives Friend Offer messages from one or more nearby nodes, i.e., potential Friend Nodes 502 and 504 in the example of FIG. 5. The LPN 506 selects one of the potential Friend Nodes 502 and 504 as its friend. In the example of FIG. 5, the LPN 506 selects potential Friend Node 502 as its friend. At stage 3, to generate the shared FKey, the LPN 506 sends its address ("LPNAddress") and Friend Counter (the number of Friend Nodes to which the LPN is or has connected) to the Friend Node 502, and the Friend Node 502 sends its address ("FriendAddress") and LPN Counter (the number of LPNs to which the Friend Node is or has connected). This information is encrypted using the NetKey, and may be included in each message between the LPN 506 and Friend Node 502. At stage 4, the LPN 506 and the Friend Node 502 generate a shared FKey based on the information received at stage 3. The LPN 506 and the Friend Node 502 can then communicate with each other using the FKey.

Because the information received at stage 3 is encrypted using the NetKey, which all nodes in the same wireless mesh network have, other neighboring nodes of the LPN 506 in the network (e.g., potential Friend Node 504) can obtain the information necessary to generate the FKey. This means that these nodes can generate the FKey and pretend to be the Friend Node 502 (referred to as a "False Friend") of the LPN 506 and can control the functionalities of the LPN 506, which violates the specification of the Friend-LPN relationship.

For example, the False Friend node can send fake poll replies to poll requests sent by the LPN 506. This can block the LPN 506 from receiving messages from the actual Friend Node 502. A clever False Friend node can send more messages over a period of time to increase the power consumption of the LPN 506 without being detected externally by the user. If this happens consistently, the LPN 506 may end up missing important network updates, which can eventually make it non-functional.

The above scenario can create the following problems: (1) a False Friend can assume the role of the Friend Node 502 for the LPN 506, eventually breaking the Friend-LPN relationship (in which only the Friend Node that is chosen by the LPN 506 should be able to control LPN functionality), (2) a False Friend can force the LPN 506 to drain more power, and (3) the LPN 506 can be rendered non-functional over a period of time.

Accordingly, the present disclosure is directed to securing friendship establishment in a mesh network using a low-energy short-range wireless network protocol, such as Bluetooth® mesh.

As a first solution, an LPN can determine the Angle of Arrival (AoA) of messages received from the Friend Node when the LPN initially establishes the FKey with the Friend Node (as illustrated in FIG. 5). That way, the LPN can compare the AoA of any incoming messages (e.g., poll response messages) to the stored AoA of the Friend Node, and if there is a mismatch, discard the incoming message(s). In this scenario, the LPN needs to keep scanning for poll response messages until a timeout is reached, or until poll response messages are received from an AoA matching the AoA associated with the true Friend Node.

In addition, when a False Friend is identified, the true Friend Node can store the AoA of messages received from the False Friend (as the Friend Node may be a relay node between the False Friend and the LPN, or the False Friend may be broadcasting messages omni-directionally). The Friend Node can then discard any messages received from that direction. This will prevent the False Friend from corrupting the Friend Node's cache (e.g., filling it with superfluous messages).

Despite its advantages, the AoA solution has several drawbacks. For example, if the False Friend is spatially close to the Friend Node, the AOA of the False Friend and the Friend Node may be so similar that it is difficult, or even impossible, for the LPN to detect the False Friend based on the AoA. As another example, this technique requires the LPN to be fixed in position, as it depends on the angle/direction between the False Friend and the LPN. Thus, for a portable LPN, this technique will not be useful. As yet another example, calculating the AoA is an additional computation that will lead to greater power consumption.

A second solution is to secure the friendship key (FKey). To secure the FKey (i.e., make it impossible to violate the Friend-LPN functionality), there should be some randomness built into the key generation, as otherwise, all of the information that is used for generating the FKey is available to devices that have the NetKey (as described above). In addition, the randomness should be provided over a secure link, such that no other device can intercept it.

Figure 6:
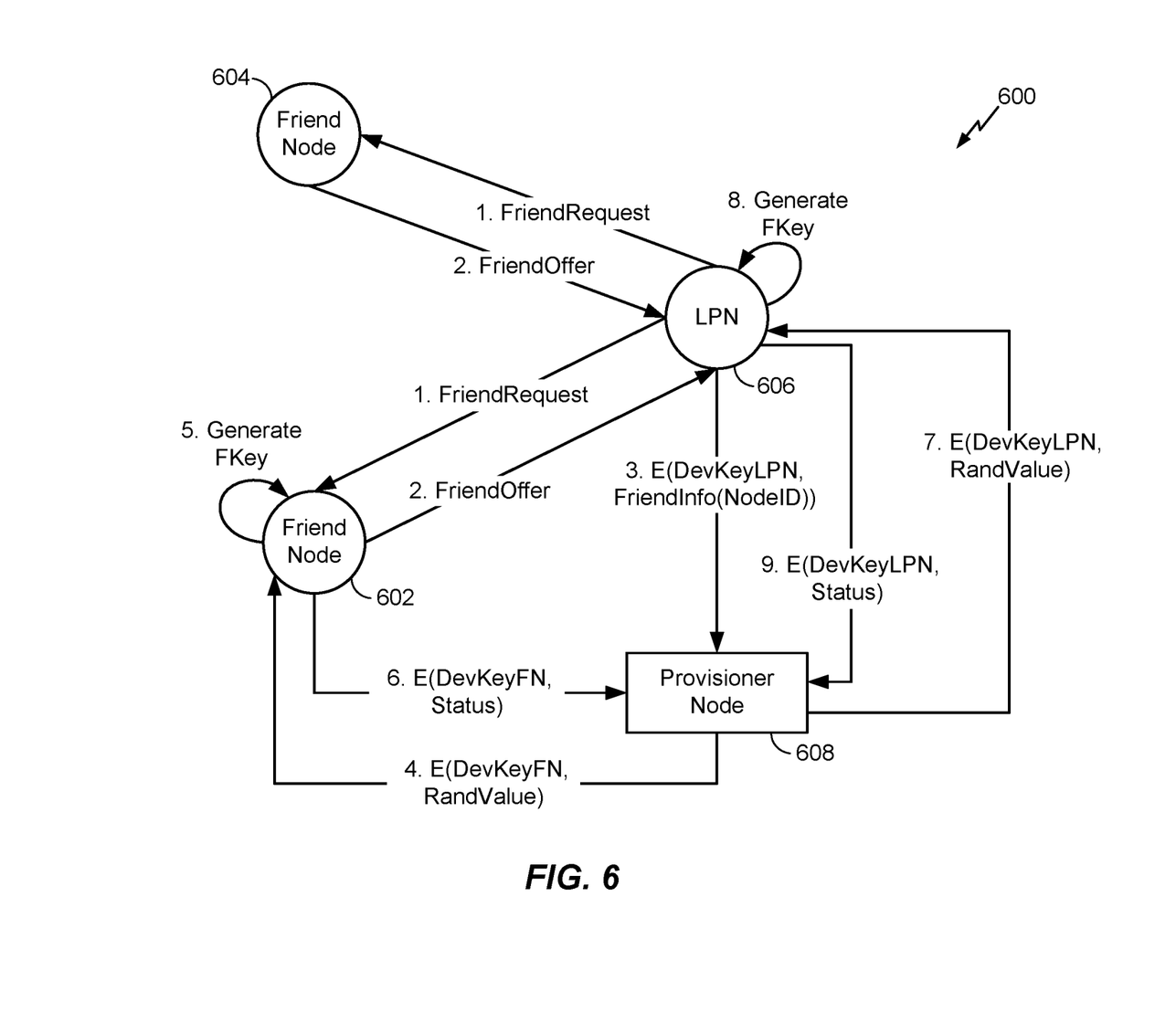
FIG. 6 is a diagram illustrating an exemplary method for securing a friendship key according to an aspect of the disclosure.

FIG. 6 is a diagram 600 illustrating an exemplary method for securing the FKey according to an aspect of the disclosure. At stage 1, an LPN 606 (which may correspond to one of nodes 110 in FIG. 1) broadcasts a Friend Request message to potential Friend Nodes 602 and 604 (which may correspond to other nodes 110 in FIG. 1). In an aspect, the potential Friend Nodes 602 and 604 may be nearby (i.e., within wireless communication range) nodes in the same wireless mesh network (e.g., wireless mesh network 100). The LPN 606 encrypts the Friend Request message using the NetKey, which is shared between all the nodes in the same wireless mesh network.

At stage 2, the LPN 606 receives Friend Offer messages from one or more nearby nodes, i.e., potential Friend Nodes 602 and 604 in the example of FIG. 6. The LPN 606 selects one of the potential Friend Nodes 602 and 604 as its friend. In the example of FIG. 6, the LPN 606 selects potential Friend Node 602 as its friend. As can be seen, stages 1 and 2 of FIG. 6 are the same as stages 1 and 2 of FIG. 5.

At stage 3, however, the LPN 606 sends the address of the selected Friend Node to the Provisioner Node 608 in a "Friend Info" message. This message may be unicast to the Provisioner Node 608, rather than broadcast, and may be encrypted with the LPN's 606 device-specific encryption key (represented as "DevKeyLPN") so that other devices cannot intercept the message and obtain the contents. At stage 4, after receiving the Friend Info message, the Provisioner Node 608 generates a random value ("RandValue") to be used for the FKey generation and sends it to the selected Friend Node 602 using that node's device-specific encryption key (represented as "DevKeyFN").

At stage 5, after receiving the configuration message from the Provisioner Node 608 at stage 4, the Friend Node 602 generates the FKey using the random value received from the Provisioner Node 608. The FKey may also be generated using one or more of the network key (NetKey), the address of the LPN, the Friend Counter of the LPN, the Friend Node's 602 own address, and its LPN Counter. For example, the FKey may be generated using the following formula:

$$FKey=k2(NetKey,0\times01\|LPNAddress\|FriendAddress\|LPNCounter\|FriendCounter\|RandValue),$$

where "k2" is defined in the Bluetooth® mesh specification.

At stage 6, after successful generation of the FKey, the Friend Node 602 sends a status message to the Provisioner Node 608 indicating that the FKey generation was successful. The status message may be encrypted with the Friend Node's 602 DevKeyFN. At stage 7, the Provisioner Node 608 sends the random value ("RandValue") to be used for the FKey generation to the LPN 606 using that node's device-specific encryption key ("DevKeyLPN").

At stage 8, after receiving the configuration message from the Provisioner Node 608 at stage 7, the LPN 606 generates the same FKey as the Friend Node 602 by using the random value received from the Provisioner Node 608 and the same formula used by the Friend Node 602 to generate the FKey. At stage 9, after successful generation of the FKey, the LPN 606 sends a status message to the Provisioner Node 608 indicating that the FKey generation was successful. The status message may be encrypted with the LPN's 606 DevKeyLPN. Once these stages are complete, the LPN 606 can send poll messages to the Friend Node 602 and the Friend Node 602 can send poll responses to the LPN 606 (as per the Bluetooth® mesh specification) using the generated FKey.

Figure 7:
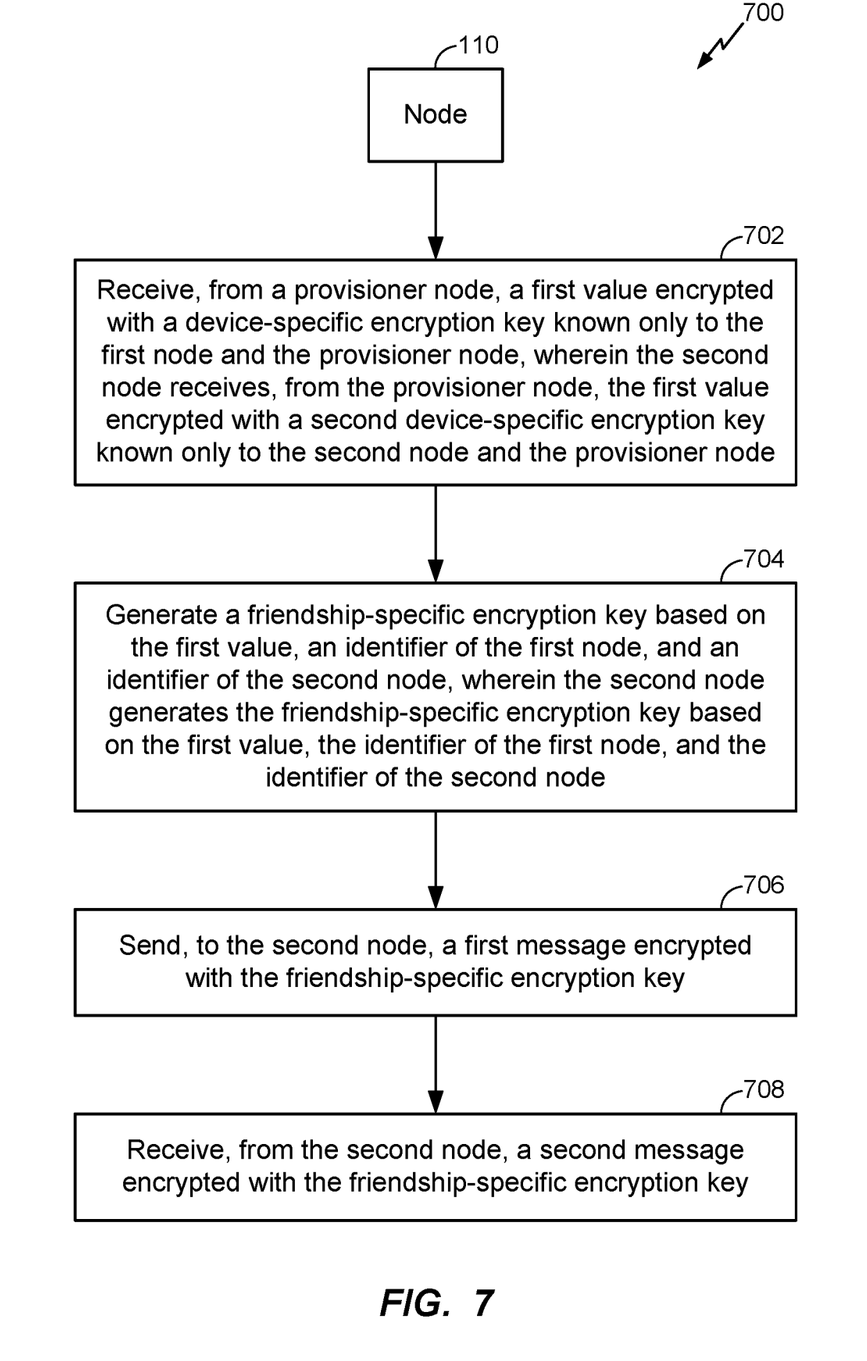
FIG. 7 illustrates an exemplary method for establishing an encrypted connection between a first node and a second node in a wireless mesh network according to an aspect of the disclosure.

FIG. 7 illustrates an exemplary method 700 for establishing an encrypted connection between a first node (e.g., one of nodes 110) and a second node (e.g., another of nodes 110) in a wireless mesh network (e.g., wireless mesh network 100) according to an aspect of the disclosure. The first node performs the method 700, and may be either a Friend Node (e.g., Friend Node 602) or an LPN (e.g., LPN 606). At 702, the first node (e.g., communication device 320 or processor 302, or wireless interface 328 or low-energy short-range wireless network processor 324, depending on the type of wireless network over which the first node communicates with the provisioner node) receives, from a provisioner node (e.g., Provisioner Node 608) in the wireless mesh network, a first value (e.g., a random number) encrypted with a device-specific encryption key (e.g., a DevKey) known only to the first node and the provisioner node, as at stage 4 or 7 in FIG. 6). The second node also receives, from the provisioner node, the first value, but encrypted with a second device-specific encryption key known only to the second node and the provisioner node.

At 704, the first node (e.g., processor 302 or low-energy short-range wireless network processor 324) generates a friendship-specific encryption key (e.g., an FKey) based on the first value, an identifier of the first node (e.g., an address of the first node), and an identifier of the second node (e.g., an address of the first node), as at stage 5 or 8 of FIG. 6. The second node also generates the friendship-specific encryption key based on the first value, the identifier of the first node, and the identifier of the second node. At 706, the first node (e.g., communication device 320 or wireless interface 328, as directed by the processor 302 or low-energy short-range wireless network processor 324, depending on the type of wireless network over which the first node communicates with the second node) sends, to the second node, a first message (e.g., a polling message or a poll response message) encrypted with the friendship-specific encryption key. At 708, the first node (e.g., communication device 320 or processor 302, or wireless interface 328 or low-energy short-range wireless network processor 324, depending on the type of wireless network over which the first node communicates with the second node) receives, from the second node, a second message (e.g., the other of the polling message or the poll response message) encrypted with the friendship-specific encryption key.

Because only the first node and the second node receive the first value from the provisioner node, and because the first value is encrypted with the first and second node's device-specific encryption keys, only the first node and the second node can generate the friendship-specific encryption key based on the received first value. As such, only the first node and the second node have the friendship-specific encryption key. Because only the first and second nodes have the friendship-specific encryption key, and because the first and second nodes communicate with each other using the friendship-specific encryption key, the communications between the first and second nodes cannot be decrypted by other nodes, thereby securing those communications. In addition, because only the first and second nodes have the friendship-specific encryption key, other nodes cannot pretend to be the Friend node of the LPN, thereby eliminating the "false friend" scenario.

In an aspect, the first value may be a random number generated by the provisioner node, thereby making it more difficult, even impossible, for another node to "guess" the first value and generate the friendship-specific encryption key on its own (i.e., without receiving it from the provisioner node).

In an aspect, the method 700 may further include sending, by the first node to the provisioner node, a status message encrypted with the first device-specific encryption key, the status message indicating successful generation of the friendship-specific encryption key, as at stage 6 or 9 of FIG. 6. An advantage of such a status message is that it informs the provisioner node that the first node successfully generated the friendship-specific encryption key, and, if the first node is the friend node, informs the provisioner node that it can send the first value to the low-power node, as at stages 6 and 7 of FIG. 6.

In an aspect, if the first node is a low-power node and the second node is a friend node, then the method 700 may further include sending, by the low-power node to the friend node, a friendship request, as at stage 1 of FIG. 6, receiving, at the low-power node from the friend node, a friendship offer, the friendship offer including the identifier of the friend node, as at stage 2 of FIG. 6, and, in response to receiving the friendship offer from the friend node, sending, by the low-power node to the provisioner node, the identifier of the friend node, as at stage 3 of FIG. 6. In an aspect, the low-power node receives the first value from the provisioner node at 702 in response to sending the identifier of the friend node to the provisioner node. In an aspect, the first message may be a polling message requesting messages stored at the friend node addressed to the low-power node, and the second message may be the messages stored at the friend node addressed to the low-power node. In an aspect, the low-power node may be a Bluetooth® Mesh LPN and the friend node may be a Bluetooth® Mesh Friend Node.

In an aspect, if the first node is a friend node and the second node is a low-power node, the method 700 may further include receiving, at the friend node from the low-power node, a friendship request, as at stage 1 of FIG. 6, and sending, by the friend node to the low-power node, a friendship offer, the friendship offer including the identifier of the friend node, as at stage 2 of FIG. 6. In an aspect, the low-power node sends the identifier of the friend node to the provisioner node, as at stage 3 of FIG. 6, and the friend node receives the first value from the provisioner node at stage 4 of FIG. 6 in response to the low-power node sending the identifier of the friend node to the provisioner node. In an aspect, the second message may be a polling message requesting messages stored at the friend node addressed to the low-power node, and the first message may be the messages stored at the friend node addressed to the low-power node. In an aspect, the friend node may be a Bluetooth® Mesh Friend Node and the low-power node may be a Bluetooth® Mesh LPN.

In an aspect, the friendship-specific encryption key may be further generated based on a counter of friend nodes with which the first node or the second node has communicated and a counter of low-power nodes with which the other of the first node or the second node has communicated. In an aspect, the friendship-specific encryption key may be further generated based on a Bluetooth® Mesh NetKey. An advantage of using this additional information is to further secure the generation of the friendship-specific encryption key with information known only to the first and second nodes.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for establishing an encrypted connection between a first node and a second node in a wireless mesh network.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for establishing an encrypted connection between a first node and a second node in a wireless mesh network, comprising:
   receiving, at the first node from a provisioner node in the wireless mesh network, a first value encrypted with a first device-specific encryption key known only to the first node and the provisioner node, wherein the second node receives, from the provisioner node, the first value encrypted with a second device-specific encryption key known only to the second node and the provisioner node;
   generating, by the first node, a friendship-specific encryption key based on the first value, an identifier of the first node, and an identifier of the second node, wherein the second node generates the friendship-specific encryption key based on the first value, the identifier of the first node, and the identifier of the second node;

sending, by the first node to the second node, a first message encrypted with the friendship-specific encryption key; and receiving, at the first node from the second node, a second message encrypted with the friendship-specific encryption key.

2. The method of claim 1, wherein the first value is a random number generated by the provisioner node.

3. The method of claim 1, further comprising:
sending, by the first node to the provisioner node, a status message encrypted with the first device-specific encryption key, the status message indicating successful generation of the friendship-specific encryption key.

4. The method of claim 1, wherein the first node is a low-power node and the second node is a friend node.

5. The method of claim 4, further comprising:
sending, by the low-power node to the friend node, a friendship request;
receiving, at the low-power node from the friend node, a friendship offer, the friendship offer including the identifier of the friend node; and
in response to receiving the friendship offer from the friend node, sending, by the low-power node to the provisioner node, the identifier of the friend node,
wherein the low-power node receives the first value from the provisioner node in response to sending the identifier of the friend node to the provisioner node.

6. The method of claim 4, wherein the first message comprises a polling message requesting messages stored at the friend node addressed to the low-power node, and wherein the second message comprises the messages stored at the friend node addressed to the low-power node.

7. The method of claim 1, wherein the first node is a friend node and the second node is a low-power node.

8. The method of claim 7, further comprising:
receiving, at the friend node from the low-power node, a friendship request; and
sending, by the friend node to the low-power node, a friendship offer, the friendship offer including the identifier of the friend node,
wherein the low-power node sends the identifier of the friend node to the provisioner node, and wherein the friend node receives the first value from the provisioner node in response to the low-power node sending the identifier of the friend node to the provisioner node.

9. The method of claim 7, wherein the second message comprises a polling message requesting messages stored at the friend node addressed to the low-power node, and wherein the first message comprises the messages stored at the friend node addressed to the low-power node.

10. The method of claim 1, wherein the friendship-specific encryption key is further generated based on a counter of friend nodes with which the first node or the second node has communicated and a counter of low-power nodes with which the other of the first node or the second node has communicated.

11. An apparatus for establishing an encrypted connection between a first node and a second node in a wireless mesh network, comprising:
a wireless interface of the first node configured to receive, from a provisioner node in the wireless mesh network, a first value encrypted with a first device-specific encryption key known only to the first node and the provisioner node, wherein the second node receives, from the provisioner node, the first value encrypted with a second device-specific encryption key known only to the second node and the provisioner node; and
at least one processor of the first node configured to:
generate a friendship-specific encryption key based on the first value, an identifier of the first node, and an identifier of the second node, wherein the second node generates the friendship-specific encryption key based on the first value, the identifier of the first node, and the identifier of the second node; and
cause the wireless interface to send, to the second node, a first message encrypted with the friendship-specific encryption key,
wherein the wireless interface is further configured to receive, from the second node, a second message encrypted with the friendship-specific encryption key.

12. The apparatus of claim 11, wherein the first value is a random number generated by the provisioner node.

13. The apparatus of claim 11, further comprising:
sending, by the first node to the provisioner node, a status message encrypted with the device-specific encryption key, the status message indicating successful generation of the friendship-specific encryption key.

14. The apparatus of claim 11, wherein the first node is a low-power node and the second node is a friend node.

15. The apparatus of claim 14, further comprising:
sending, by the low-power node to the friend node, a friendship request;
receiving, at the low-power node from the friend node, a friendship offer, the friendship offer including the identifier of the friend node; and
in response to receiving the friendship offer from the friend node, sending, by the low-power node to the provisioner node, the identifier of the friend node,
wherein the low-power node receives the first value from the provisioner node in response to sending the identifier of the friend node to the provisioner node.

16. The apparatus of claim 14, wherein the first message comprises a polling message requesting messages stored at the friend node addressed to the low-power node, and wherein the second message comprises the messages stored at the friend node addressed to the low-power node.

17. The apparatus of claim 11, wherein the first node is a friend node and the second node is a low-power node.

18. The apparatus of claim 17, further comprising:
receiving, at the friend node from the low-power node, a friendship request; and
sending, by the friend node to the low-power node, a friendship offer, the friendship offer including the identifier of the friend node,
wherein the low-power node sends the identifier of the friend node to the provisioner node, and wherein the friend node receives the first value from the provisioner node in response to the low-power node sending the identifier of the friend node to the provisioner node.

19. The apparatus of claim 17, wherein the second message comprises a polling message requesting messages stored at the friend node addressed to the low-power node, and wherein the first message comprises the messages stored at the friend node addressed to the low-power node.

20. The apparatus of claim 11, wherein the friendship-specific encryption key is further generated based on a counter of friend nodes with which the first node or the second node has communicated and a counter of low-power nodes with which the other of the first node or the second node has communicated.

21. A non-transitory computer-readable medium storing computer-executable instructions for establishing an encrypted connection between a first node and a second node in a wireless mesh network, the computer-executable instructions comprising:
- at least one instruction instructing the first node to receive, from a provisioner node in the wireless mesh network, a first value encrypted with a first device-specific encryption key known only to the first node and the provisioner node, wherein the second node receives, from the provisioner node, the first value encrypted with a second device-specific encryption key known only to the second node and the provisioner node;
- at least one instruction instructing the first node to generate a friendship-specific encryption key based on the first value, an identifier of the first node, and an identifier of the second node, wherein the second node generates the friendship-specific encryption key based on the first value, the identifier of the first node, and the identifier of the second node;
- at least one instruction instructing the first node to send, to the second node, a first message encrypted with the friendship-specific encryption key; and
- at least one instruction instructing the first node to receive, from the second node, a second message encrypted with the friendship-specific encryption key.

22. An apparatus for establishing an encrypted connection between a first node and a second node in a wireless mesh network, comprising:
- means for receiving, at the first node from a provisioner node in the wireless mesh network, a first value encrypted with a first device-specific encryption key known only to the first node and the provisioner node, wherein the second node receives, from the provisioner node, the first value encrypted with a second device-specific encryption key known only to the second node and the provisioner node;
- means for generating, by the first node, a friendship-specific encryption key based on the first value, an identifier of the first node, and an identifier of the second node, wherein the second node generates the friendship-specific encryption key based on the first value, the identifier of the first node, and the identifier of the second node;
- means for sending, by the first node to the second node, a first message encrypted with the friendship-specific encryption key; and
- means for receiving, at the first node from the second node, a second message encrypted with the friendship-specific encryption key.

* * * * *